No. 876,235. PATENTED JAN. 7, 1908.
L. G. QUACKENBOSS.
ADJUSTABLE FLOWER BOX.
APPLICATION FILED NOV. 7, 1904.
2 SHEETS—SHEET 1.
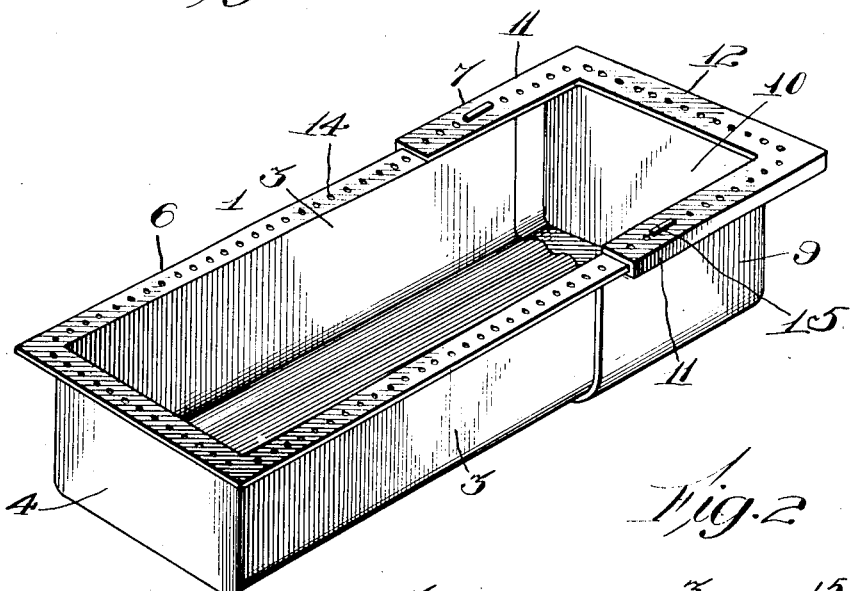
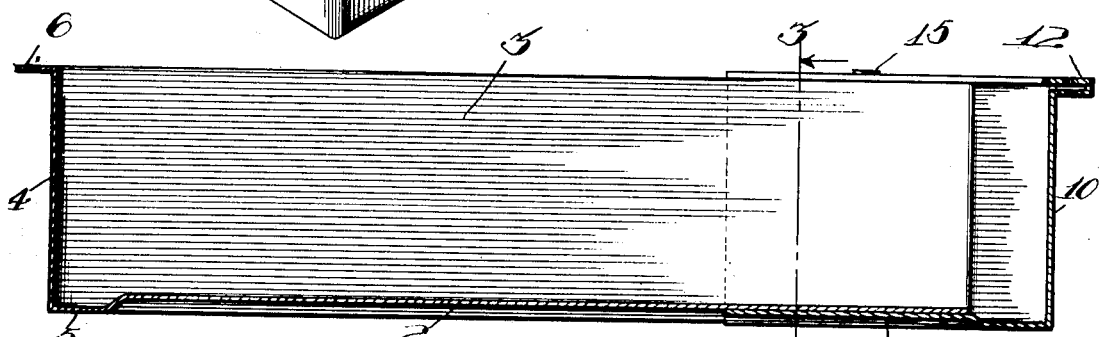
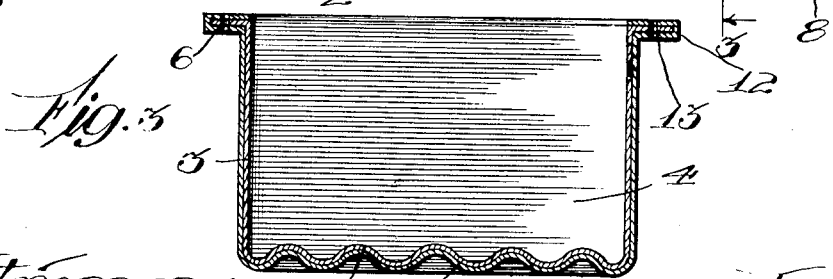
Witnesses:
G. A. Domarus.
W. Perry Hahn.
Inventor:
Leonard G. Quackenboss
by Jones & Addington
Attorneys.

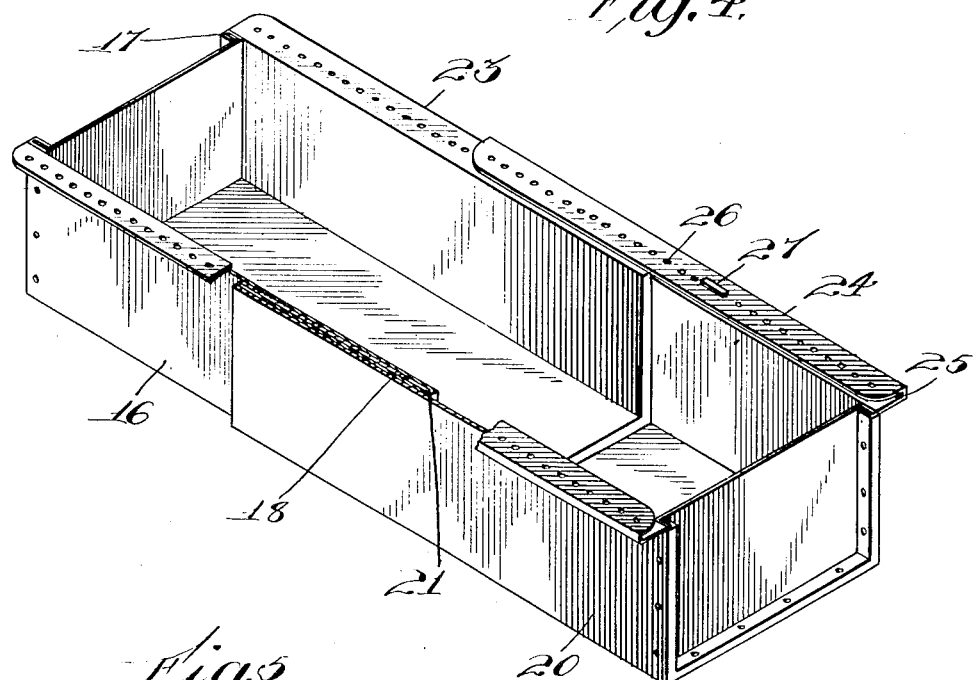
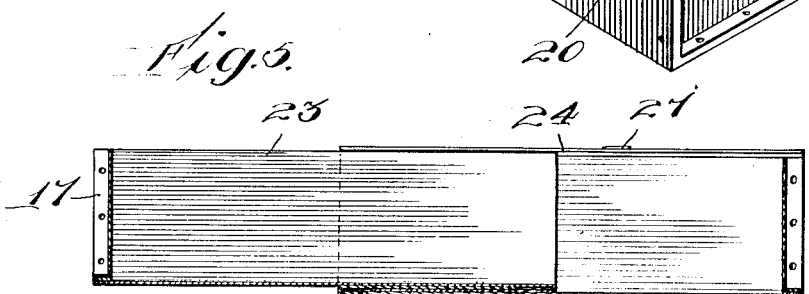
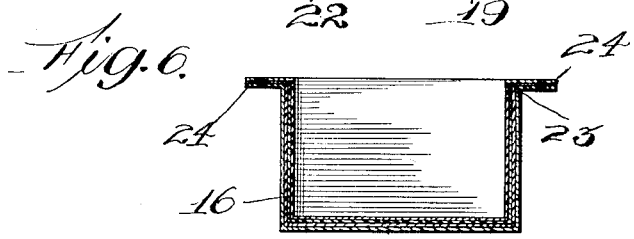

UNITED STATES PATENT OFFICE.

LEONARD G. QUACKENBOSS, OF CHICAGO, ILLINOIS.

ADJUSTABLE FLOWER-BOX.

No. 876,235.  Specification of Letters Patent.  Patented Jan. 7, 1908.

Application filed November 7, 1904. Serial No. 231,751.

*To all whom it may concern;*

Be it known that I, LEONARD G. QUACKENBOSS, a citizen of the United States, residing at Chicago, in the county of Cook and State of Illinois, have invented new and useful Improvements in Adjustable Flower-Boxes, of which the following is a full, clear, concise, and exact description, reference being had to the accompanying drawing, forming a part of this specification.

My invention relates to improvements in flower boxes, designed particularly for the reception of growing plants, etc.

Such devices have heretofore been constructed to fit each separate location. It is the object of my present invention to provide a box of this character, which shall be readily adjustable to be fitted in different positions.

A further object of my invention is to provide a non-destructible box which shall withstand the rotting effect of the earth contained therein, or the destructive effect of the elements to which it is exposed.

I have illustrated one embodiment of my invention in the accompanying drawing, in which Figure 1 is a perspective view of my device; Fig. 2 is a longitudinal sectional view thereof; Fig. 3 is a transverse sectional view taken on the line 3—3 of Fig. 2; Fig. 4 is a perspective view of a modification of my device, the flanges being broken away to show the interlocking means; Fig. 5 is a longitudinal sectional view of this modified device; Fig. 6 is a transverse sectional view thereof.

As shown in the drawings, my device consists of a box-like structure 1, having the bottom 2, the sides 3, 3, and the end 4. I preferably form the device of galvanized iron, although the same may be constructed of any other suitable material, if desired. The bottom 2, is preferably corrugated, as shown, or paneled, the corrugations extending longitudinally of the bottom to a point near the end 4, the portion 5 between the corrugations and the end being flat, as shown or the corrugations may extend clear to the ends, if desired. The opposite end of the body portion 1 is left open and the corrugations extend clear to this end of the bottom. Flanges 6 are here shown as bent outwardly from the top rim of the sides and end, and serve the double purpose of strengthening the box and preventing the sides from being bent outwardly by the weight of the earth contained therein, and of forming guides over which channel portions of the adjustable end 7 are adapted to fit. These grooves or channels may be bent upwardly, inwardly, or otherwise as desired.

The adjustable end, as here shown, consists of a box-like structure, having the bottom 8, the sides 9 and the end portion 10, and is constructed slightly larger than the body portion 1, in order that the same may fit around said body portion and the two parts may telescope upon one another. The adjustable end portion 7 has, in this case, outwardly turned flanges 11 on the sides thereof, and an outwardly extending end flange 12. The side flanges 11 are provided with channels 13, into which the side flanges 6 are adapted to slide. The channels 13 are preferably formed by turning the sheet metal back upon itself, as shown in the drawings, although these channels may be formed in any other desired manner. The bottom of the adjustable end may also be corrugated, or paneled, the corrugations corresponding with those formed in the bottom of the body portion 1, whereby when the adjustable end is moved to its practical limit, the corrugations, or paneling, will tend to prevent lateral displacement of the end, which might otherwise occur and cause the parts to become separated. The corrugations also strengthen the entire structure and permit the use of lighter material than otherwise.

I have shown my device as being constructed in two sections only, but it will be understood that the same may be constructed in three or more sections, if so desired, in which instance two adjustable end sections would be provided, adapted to fit over a central section. It will also be understood that the arrangement of the parts may be reversed and the adjustable end sections be constructed to fit within the body sections.

The side flanges 6 and 11, as here shown, have openings 14 formed therein, through which fastening means 15 are adapted to pass to hold said sections together. Any convenient manner of securing these sections together may be employed, however.

In Fig. 4 I have shown a modification of my device, in which I provide locking means between the two sections, which prevent the same from being disengaged. As shown in said figure, the body portion 16 is formed of sheet metal and has its closed end bent to form the bracing flanges 17. The sides and bottom of the device are bent back upon themselves to form hooks or loops 18 and 19. The end portion 20 is formed substantially the same as the body portion 16 in that it has the sides and body portions bent back to form loops or hooks 21 and 22, adapted to engage the loop portions 18 and 19, and connect the two portions together. Flanges 23 and 24 are formed on the sides of the two sections and the flanges 24 are provided with channels 25 adapted to fit over the flanges 23 of the body portion 16. Openings 26 are formed in the flanges through which fastening devices 27 are adapted to pass for holding the two sections in any adjusted position as described with reference to Fig. 1.

While I have shown and described only certain forms of my device, I do not wish to limit myself to those particular constructions, as there are numerous changes which may be made without departing from the spirit of my invention.

Having thus described my invention what I claim as new and desire to secure by Letters Patent is:

1. In an adjustable plant box, the combination with two telescoping parts, of flanges formed upon the sides of one of said parts, flange members on the sides of the other of said parts formed about and inclosing said flanges, said inclosing flange members and said inner flanges having registering openings, and a pin for insertion into said openings to lock the parts against relative movement.

2. In an adjustable plant box, the combination with two telescoping parts having registering corrugated bottoms, of an outwardly extending flange on each of the sides of one of said parts at the top thereof, a flange member at the top of each of the sides of the other of said parts formed about the associated outwardly extending flange to form a runway therefor, said inclosing flange members and said inner flanges having registered openings, and a pin for insertion into said openings to lock the parts against relative movement.

3. In an adjustable plant box, the combination with a body portion having a corrugated bottom, of a flange extending outwardly at the top of each of the sides of said body portion, an end portion telescoped upon said body portion and having a corrugated bottom registering with the corrugated bottom of said body portion, an extending flange at the top of each of the sides of said end portion formed about the associated flange on the body portion to form a runway therefor, a series of openings in said runways registering with a series of openings in said inner flanges, and a pin for insertion into said openings to lock the parts against relative movement.

In witness whereof, I have hereunto subscribed my name in the presence of two witnesses.

LEONARD G. QUACKENBOSS.

Witnesses:
 ELIZABETH R. KING.
 W. PERRY HAHN.